United States Patent [19]

McGrath et al.

[11] Patent Number: 5,632,543
[45] Date of Patent: May 27, 1997

[54] APPLIANCE CABINET CONSTRUCTION

[75] Inventors: Ralph D. McGrath, Granville; Bret E. Kline, Columbus; Dwight S. Musgave, Granville, all of Ohio

[73] Assignee: Owens-Corning Fiberglas Technology Inc., Summit, Ill.

[21] Appl. No.: 486,482

[22] Filed: Jun. 7, 1995

[51] Int. Cl.$^6$ ................................................. A47B 96/04
[52] U.S. Cl. ........................................... 312/406; 220/467
[58] Field of Search .................................. 312/400, 405, 312/406, 406.2; 220/452, 467

[56] References Cited

U.S. PATENT DOCUMENTS

| 1,321,097 | 11/1919 | Gonzalez . |
| 1,397,269 | 11/1921 | Dodge . |
| 1,588,707 | 6/1926 | Csiga . |
| 1,747,969 | 2/1930 | Carrey . |
| 1,889,214 | 11/1932 | O'Leary . |
| 1,911,432 | 5/1933 | Chase . |
| 2,084,204 | 6/1937 | Knight ................................. 220/467 |
| 2,088,716 | 8/1937 | Money . |
| 2,164,143 | 6/1939 | Munters . |
| 2,240,487 | 5/1941 | Benham . |
| 2,275,365 | 3/1942 | Hintze . |
| 2,481,972 | 9/1949 | Betts . |
| 2,579,157 | 12/1951 | Price . |
| 2,670,820 | 3/1954 | Northington . |
| 2,741,341 | 4/1956 | Anderson . |
| 2,745,173 | 5/1956 | Janos . |
| 2,768,046 | 10/1956 | Evans . |
| 2,912,725 | 11/1959 | Ries . |
| 3,179,549 | 4/1965 | Strong et al. . |
| 3,979,869 | 9/1976 | Beehler . |
| 4,087,143 | 5/1978 | Barnard et al. . |
| 4,190,305 | 2/1980 | Knight et al. . |
| 4,359,496 | 11/1982 | Kratel et al. . |
| 4,376,082 | 3/1983 | Heck . |
| 4,444,821 | 4/1984 | Young et al. . |
| 4,447,301 | 5/1984 | Benson . |
| 4,589,240 | 5/1986 | Kendall et al. . |
| 4,668,551 | 5/1987 | Kawasaki et al. . |
| 4,702,963 | 10/1987 | Phillips et al. . |
| 4,726,974 | 2/1988 | Nowobilski et al. . |
| 4,802,060 | 1/1989 | Immel . |
| 4,922,674 | 5/1990 | Thorn . |
| 4,974,914 | 12/1990 | Jenkins . |
| 5,007,226 | 4/1991 | Nelson . |
| 5,090,981 | 2/1992 | Rusek, Jr. . |
| 5,094,899 | 3/1992 | Rusek, Jr. . |
| 5,252,408 | 10/1993 | Bridges et al. . |
| 5,286,320 | 2/1994 | McGrath et al. . |
| 5,330,816 | 7/1994 | Rusek, Jr. . |

FOREIGN PATENT DOCUMENTS

| 149603 | 2/1952 | Australia . |
| 1358454 | 4/1963 | France . |
| 2115583 | 7/1992 | France . |
| 1056630 | 5/1959 | Germany ........................... 312/400 |
| 8415798 | 5/1984 | Germany . |
| 3905308 | 2/1989 | Germany . |
| 0542501 | 5/1993 | WIPO . |

OTHER PUBLICATIONS

Flynn et al., "Finite Element Analysis of Heat Transfer through the Gasket Region of Refrigerator/Freezers," United States Environmental Protection Agency, Air and Radiation, (ANR–445), EPA/430/R–92/009, Oct. 1992, pp. 1–29.

DiChristina, "Home Newsfront" *Popular Science*, Jul. 1992 p. 32.

*Primary Examiner*—Peter M. Cuomo
*Assistant Examiner*—Gerald A. Anderson
*Attorney, Agent, or Firm*—C. Michael Gegenheimer; Curtis B. Brueske

[57] ABSTRACT

An insulated appliance cabinet is provided comprising a mounting structure and a plurality of vacuum insulation panels retained by the mounting structure and positioned relative to one another so as to define a substantially completely enclosed insulation shell.

15 Claims, 4 Drawing Sheets

APPLIANCE CABINET CONSTRUCTION

FIELD OF THE INVENTION

This invention relates generally to an appliance cabinet construction which allows for the easy removal and replacement of insulation from the cabinet. More particularly, the invention is directed to an appliance cabinet wherein insulation panels forming a portion of the cabinet, which have failed and no longer properly insulate the interior of the cabinet from the surrounding atmosphere, may be easily removed and replaced with new insulation panels. This invention further relates to an appliance cabinet having a plurality of vacuum insulation panels retained by its mounting structure and positioned relative to one another so as to define a substantially completely enclosed insulation shell.

BACKGROUND OF THE INVENTION

Appliances requiring thermal insulation in the panel walls thereof, especially refrigerators and freezers, are generally manufactured by providing an outer structural shell of sheet metal, inserting therein an interior liner of a plastic material, and foaming a polyurethane insulation in-situ therebetween. The foamed-in-place insulation adheres to the metal shell and the plastic liner, and cannot thereafter be removed if it fails as a result of, for example, deterioration of the insulation, wetting of the insulation due to the condensation of moisture, etc. Alternatively, some manufacturers of appliances merely place batts of thermal insulation between the outer structural metal shell and the interior plastic liner which is connected thereto. In either case, if the insulation fails, it cannot be removed and replaced easily with fresh insulation in order to restore the efficiency of the appliance. When the thermal performance of the insulation degrades, the appliance requires more energy to operate. A further disadvantage associated with foamed materials is that they oftentimes contain unacceptable amounts of chlorinated fluorocarbons.

U.S. Pat. No. 4,974,914 discloses a refrigerator having an outer metal shell and an inner polymeric liner with foamed-in-place insulation therebetween. The insulation is not easily removable from the disclosed cabinet construction.

It would be desirable to produce an appliance cabinet which would allow ready access to the insulation for the replacement or repair thereof. It would also be desirable to produce an appliance cabinet which employs insulation materials having high R-values (R-value is the common terminology applied to Thermal Resistance and is a measure of an insulation product's ability to retard heat flow) to yield an energy efficient insulation appliance. It would further be desirable to produce an appliance cabinet which employs insulation materials having high R-values which are devoid of unacceptable amounts of chlorinated fluorocarbons.

SUMMARY OF THE INVENTION

These needs are met by the present invention wherein an appliance cabinet construction is provided which allows for the easy removal and replacement of insulation from the cabinet. A further feature of the present invention is that it employs insulation materials having high R values, yet are substantially devoid of ozone-harming chlorinated fluorocarbons.

In accordance with a first aspect of the present invention, an insulated appliance is provided comprising a mounting structure and a plurality of vacuum insulation panels. The panels are retained by the mounting structure and positioned relative to one another so as to define a substantially completely enclosed insulation shell.

The mounting structure comprises a mounting frame, an inner liner and a door frame. The mounting frame includes first and second sections each having an insulation receiving portion defined about its outer periphery. The mounting frame further comprises securement structure for releasably securing the first and second sections and the inner liner together. The first and second sections of the mounting frame and the inner liner may be made from a fiberglass reinforced plastic. The first section of the mounting frame may be integral with the inner liner.

Each of the vacuum insulation panels has a flange extending about its outer periphery. The outer peripheral flange of at least one of the insulation panels is received in one or both of the receiving portions defined in the outer peripheries of the first and second sections.

The securement structure may comprise a plurality of flexible mounting straps each having opposing ends adapted to be releasably connected to the first section. Alternatively, the securement structure may comprise a plurality of securing rods or the like extending between the first and second sections to releasably connect the two sections and the inner liner together.

The appliance may comprise a "built-in" unit and, hence, not include an outer shell. Alternatively, an outer shell may be provided.

The appliance may further comprise one or more foam panels positioned adjacent to the vacuum insulation panels. The foam panels define an outer protective layer for the vacuum insulation panels. They also serve to further insulate the interior of the appliance from the surrounding environment.

In accordance with a second aspect of the present invention, an insulated appliance cabinet is provided comprising a mounting structure and a plurality of vacuum insulation panels retained by the mounting structure and positioned relative to one another so as to define a substantially completely enclosed insulation shell.

In accordance with a third aspect of the present invention, an insulated appliance cabinet is provided comprising a mounting structure and at least two vacuum insulation panels. Each of the panels includes a pan portion and a top portion. The panels are retained by the mounting structure and positioned relative to one another such that a gap is defined between the pan portions of the first and second insulation panels. Insulation, such as fiber insulation, is provided in the gap between the pan portions to inhibit transfer of energy in the form of heat through the gap.

In accordance with a fourth aspect of the present invention, an insulated appliance cabinet is provided comprising a mounting structure and a plurality of vacuum insulation panels retained by the mounting structure. The mounting structure includes a door, an inner liner and a mounting frame. First and second sealing elements are located at the interface between the door and one or both of the inner liner and the mounting frame for sealing the door with one or both of the inner liner and the mounting frame.

Accordingly, it is an object of the present invention to provide an improved appliance cabinet construction which allows for the easy removal and replacement of insulation from the cabinet. It is another object of the present invention to provide an appliance cabinet provided with insulation panels having a high R value. It is a further object of the present invention to provide an appliance cabinet having insulation panels that are substantially devoid of chlorinated fluorocarbons. It is yet another object of the present invention to provide an energy efficient insulated appliance which includes insulation materials that are easily removable and are substantially devoid of chlorinated fluorocarbons.

These and other objects of the present invention will be apparent from the following description, the accompanying drawings and the appended claims.

DETAILED DESCRIPTION OF THE PREFERRED EMBODIMENT

Figure 1:
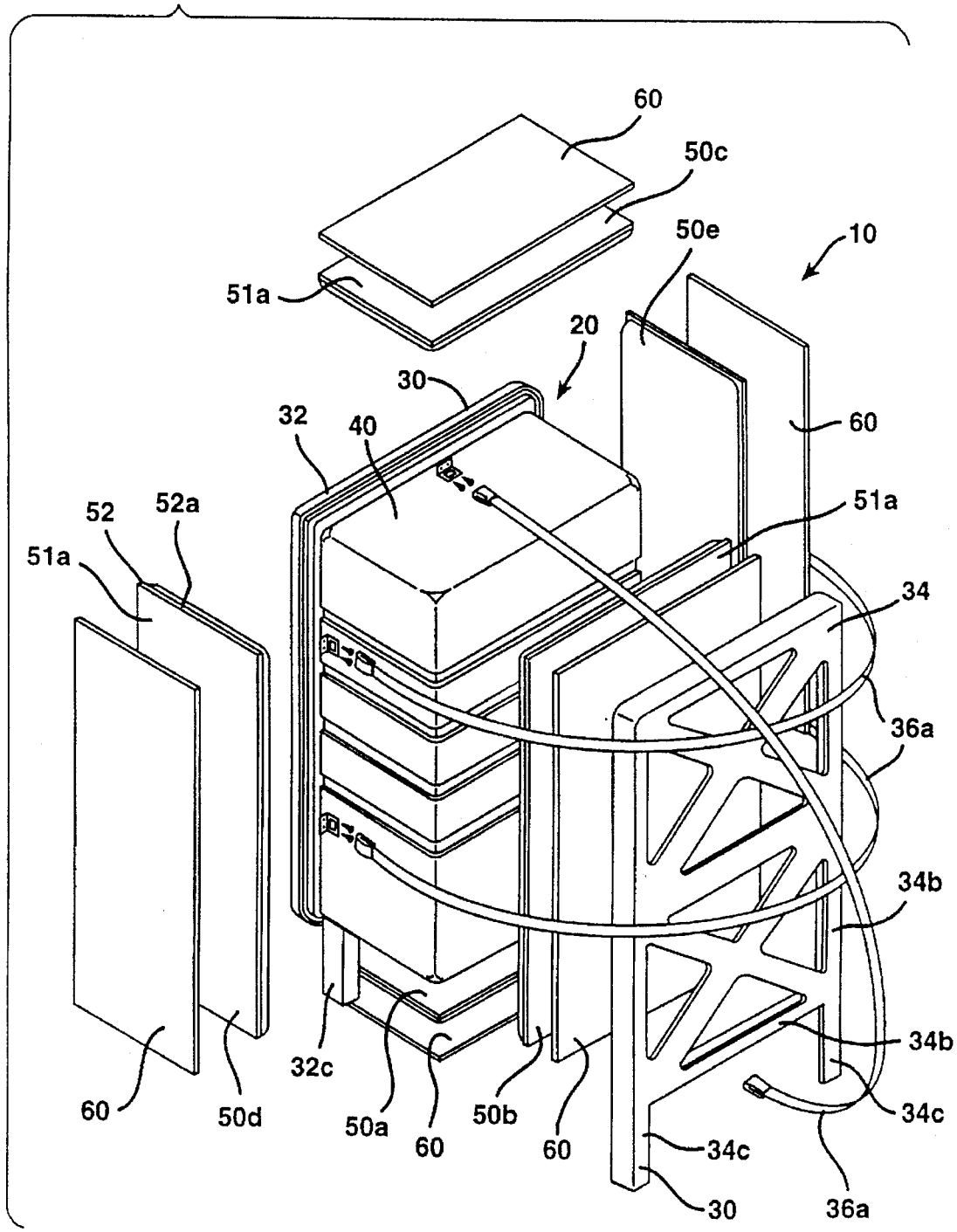
FIG. 1 is a schematic, exploded, perspective view of an insulated appliance cabinet formed in accordance with the present invention.

Referring now to FIG. 1, there is shown generally at 10 an exploded view of an insulated cabinet constructed in accordance with the present invention and adapted for use in an insulated appliance. The term "insulated appliance," as it is used herein, means a domestic or commercial appliance which conventionally uses thermal or acoustical insulation materials to isolate at least a portion of the interior of the appliance from the atmosphere surrounding the appliance, e.g., an oven, a dishwasher, and especially a refrigerator or freezer. Accordingly, the illustrated insulated cabinet 10 is especially adapted for use in a refrigerator or freezer.

The cabinet 10 comprises a mounting structure 20 and a plurality of high R-value vacuum insulation panels 50a–50f, each of which may be constructed as disclosed in any one of U.S. Pat. Nos. 5,330,816, 5,286,320, 5,094,899 and 5,090, 981, the disclosures of which are incorporated herein by reference. In the illustrated embodiment, each of the panels 50a–50f has a pan portion 50i and a top portion 50j. The panels 50a–50f are retained by the mounting structure 20 and positioned relative to one another so as to define a substantially completely enclosed insulation shell.

Figure 2:
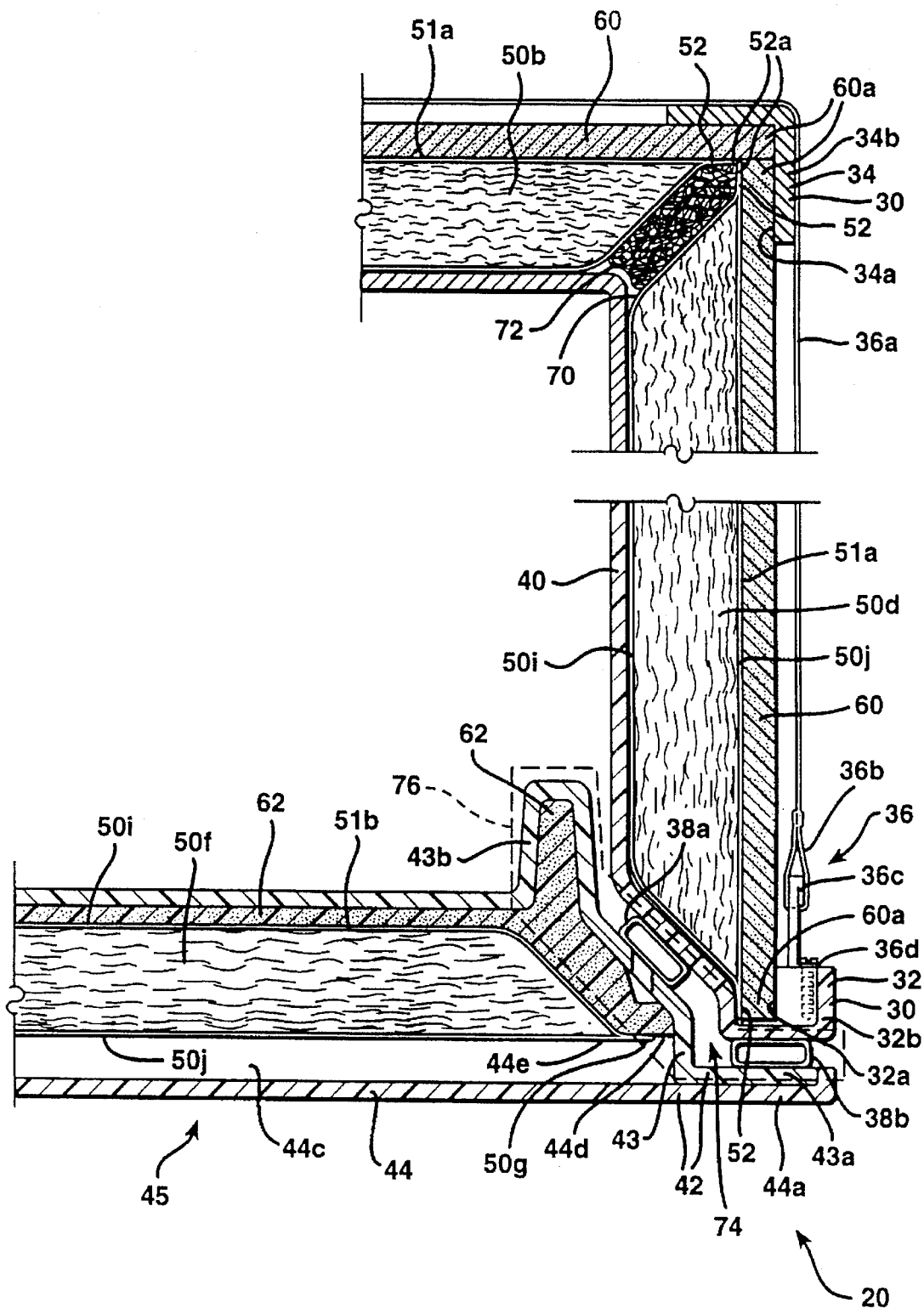
FIG. 2 is a fragmentary, cross-sectional view of an assembled portion of the insulated appliance cabinet of FIG. 1.
Figure 3:
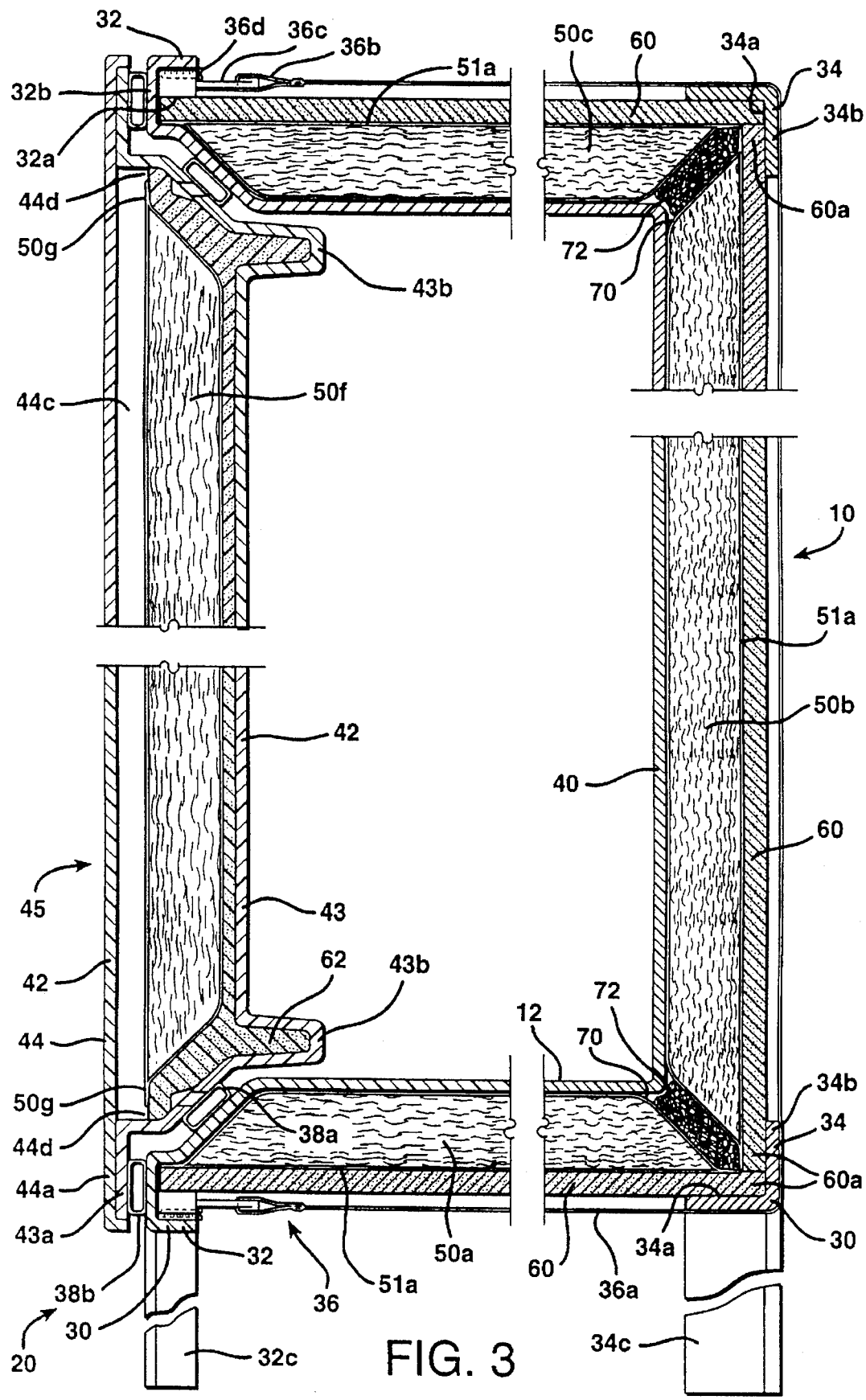
FIG. 3 is a cross-sectional view through the assembled appliance cabinet of the present invention including its door.

The mounting structure 20 comprises a mounting frame 30, an inner liner 40 and a door frame 42, see also FIGS. 2 and 3. The mounting frame 30 comprises first and second sections 32 and 34 and securement structure 36 for releasably securing the first and second sections 32 and 34 and the inner liner 40 together. The door frame 42 comprises first and second parts 43 and 44 which are adhesively bonded, mechanically joined or otherwise secured to one another at their respective outer peripheral flange portions 43a and 44a, see FIG. 2. In the illustrated embodiment, the first section 32 is integral with the inner liner 40, see FIG. 1. It is also contemplated that the inner liner 40 may be formed separate from the first section 32.

In the illustrated embodiment, the securement structure 36 comprises a plurality of flexible mounting straps 36a each having opposing ends 36b fastened to corresponding connectors 36c which in turn are releasably connected with the first section 32 of the mounting frame 30 by threaded fasteners 36d. The straps 36a may be made from nylon or any other suitable material. Other conventional connector means for releasably connecting the opposing ends 36b of the mounting straps 36a to the first section 32 may be used in place of the connectors 36c and the fasteners 36d.

Alternatively, the securement structure 36 may comprise a plurality of securement rods (not shown) extending between the first and second sections 32 and 34 for releasably connecting the two sections 32 and 34 and the inner liner 40 together.

The first and second sections 32 and 34, the inner liner 40 and the door frame parts 43 and 44 are made from a structurally rigid material. Preferably, the sections 32 and 34, the inner liner 40 and the frame parts 43 and 44 are made from a fiberglass reinforced plastic such as a polyester-based sheet molding compound (SMC); although they may be formed from rigid unreinforced polymeric materials such as high density polyethylene, coated metals, etc. The inner liner 40 is preferably formed having conventional interior shelf support ribs (not shown) and/or hanging shelf bracket slots (not shown).

The first section 32 of the mounting frame 30 has an insulation panel receiving portion 32a, a recess in the illustrated embodiment, defined about its outer periphery 32b, see FIGS. 2 and 3. Likewise, the second section 34 is provided with an insulation panel receiving portion 34a defined about its outer periphery 34b.

Each of the vacuum insulation panels 50a–50e includes a flange 52 extending about its outer periphery 52a, see FIGS. 1–3. In the illustrated embodiment, panels 50a–50e are retained by the mounting frame 30 while panel 50f is retained by the door frame 42. Portions of the flanges 52 of the panels 50a–50e are received by the receiving portions 32a and 34a defined in the outer peripheries 32b and 34b of the first and second sections 32 and 34, see FIGS. 2 and 3. Also received by the receiving portions 32a and 34a are outer peripheral portions 60a of foam panels 60. The foam panels 60 overlay the outer surfaces 51a of the panels 50a–50e and hence define an outer protective layer for the panels 50a–50e to prevent the panels 50a–50e from becoming damaged during shipment or installation. The foam panels 60 also provide additional insulation for the cabinet 10. The foam panels 60 may have a thickness of approximately 0.5 inch.

Gaps 70 definedby adjacent insulation panels 50a–50e, the inner liner 40 and the foam panels 60 are filled with mineral fiber insulation 72, see FIGS. 2 and 3. The fiber insulation 72 serves to reduce the energy in the form of heat which is transferred between the surrounding atmosphere and the interior 12 of the cabinet 10. Any other conventional insulation material may be used in place of the fiber insulation 72, such as a resin foamed material (not shown).

Figure 4:
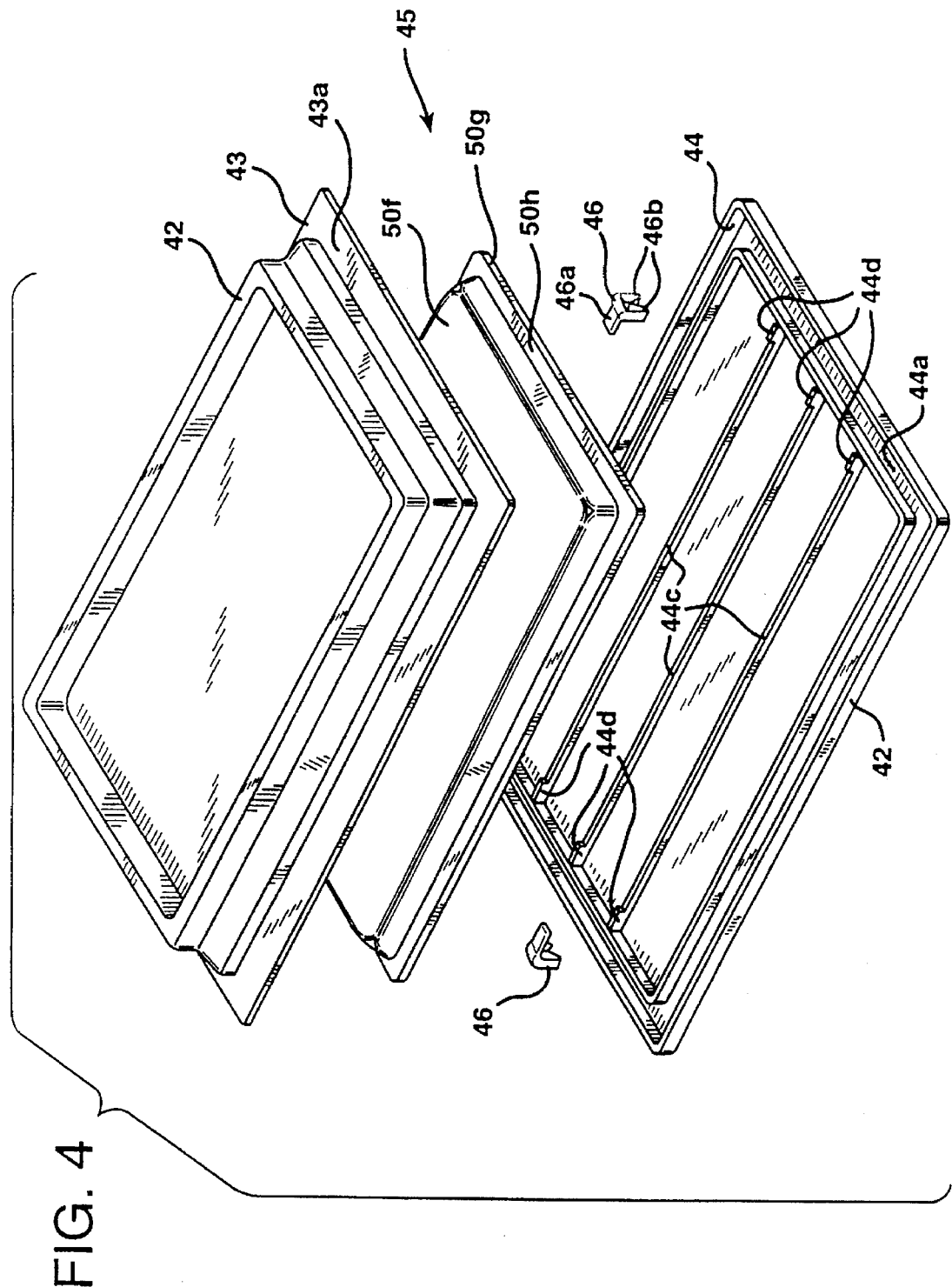
FIG. 4 is a schematic, exploded, perspective view of the door of the appliance cabinet of FIG. 1.

Referring now to FIG. 4, the cabinet 10 further includes a door 45 which is comprised of the door frame parts 43 and 44 and the vacuum insulation panel 50f. Conventional hinge mounts (not shown) allow the door 45 to be hingedly connected to the first section 32 of the mounting frame 30.

The outer door frame part 44 is formed having a plurality of generally parallel and spaced-apart panel supporting ribs 44c. The ribs 44c include extending portions 44d which define a recess 44e for receiving the vacuum insulation panel 50f, see FIG. 2. Thus, an outer peripheral edge or flange 50g of the panel 50f is engaged by the extending portions 44d of the ribs 44c, see also FIG. 3. Clips 46 are provided for securing the panel 50f to the outer door frame part 44, see FIG. 4 (the clips 46 are not shown in FIGS. 2 and 3). Each clip 46 has an upper portion 46a which engages the outer peripheral portion 50h of the panel 50f and two leg portions 46b which frictionally grip a corresponding extending rib portion 44d.

In the illustrated embodiment, a resin foam material 62, such as a polyurethane or a polystyrene foam material, is formed in-situ between the vacuum insulation panel 50f and the inner door frame part 43, see FIGS. 2 and 3. The foam material 62 secures the panel 50f to the inner frame part 43 and provides additional structural support for the door 45. The foam material 62 also further insulates the inner cavity 12 of the cabinet 10 from the surrounding atmosphere.

In an alternative embodiment of the present invention, the inner door frame part 43 is formed having an integral panel receiving cavity (not shown) which is shaped to conform to the inner face 51b of the panel 50f. Hence, the resin foam material 62 would not be employed. Further, the first and second parts 43 and 44 of the door frame 42 are releasably secured to one another at their respective outer peripheral flange portions 43a and 44a such as by conventional mechanical fasteners (not shown). In this embodiment, the panel 50f may be easily removed from the first and second parts 43 and 44 should it fail during use.

Typically the sealing strip area of a refrigerator or freezer, which usually includes the opposing inner perimetric portions of the cabinet shell and cabinet door, is a problematic heat gain area. In the present invention, heat gain through sealing area 74 is minimized by providing first and second sealing elements or strips 38a and 38b, see FIGS. 2 and 3, which form part of the mounting structure 20. The first sealing strip 38a is located between the first part 43 of the door frame 42 and the inner liner 40 to seal the first part 43 to the inner liner 40 when the door 45 is in its closed position. The second sealing strip 38b is located between the flange portion 43a of the first part 43 and the first section 32 to seal the first part 43 to the first section 32 when the door 45 is in its closed position. Use of the two strips 38a and 38b is believe to substantially reduce the transfer of heat at the interfaces between the door 45 and the inner liner 40 and first section 32.

To further reduce heat gain through the sealing area 74, the inner door frame part 43 is formed having a protruding insulation portion 43b filled with resin foam material 62. The insulation portion 43b together with the first and second strips 38a and 38b form part of an insulation area 76, see FIG. 2, which blocks a substantial portion of energy in the form of heat which would normally pass through the sealing area 74. The insulation area 76 also reduces heat gain which may result due to the vacuum insulation panels 50a and 50c–50f having increased heat transfer at their flanges 52 and 50g. As the insulation area 76 is increased, heat gain through the sealing area 74 is reduced; however, usable interior volume within the cabinet 10 is also reduced. It is believed that the ratio of heat gain per usable interior cabinet volume decreases as the insulation area 76 is increased until an optimum insulation area value is reached. Beyond that optimum value, it is believed that the ratio of heat gain per usable interior cabinet volume increases with increases in the insulation area 76.

The appliance cabinet 10 is particularly useful for manufacturing refrigerators and freezers. In making such a device, typical components, such as a compressor, heat exchange equipment and electronic controls (not shown), may be housed in a module (not shown) located beneath the panel 50a and between legs 32c and 34c of the first and second sections 32 and 34.

The resultant refrigerator or freezer may comprise a "built-in" unit and, hence, not include an outer shell. Alternatively, an outer shell (not shown) made, for example, from a metal, may be provided.

With the cabinet 10 of the present invention, should one of the vacuum insulation panels 50a–50f fail and no longer properly insulate the interior 12 of the appliance cabinet 10 from the surrounding atmosphere, it may be easily removed and replaced with a new vacuum insulation panel. For replacement of one or more of the panels 50a–50e, the securement structure 36 need only be removed to allow the first and second sections 32 and 34 to be separated from one another. With regard to panel 50f, if foam material 62 is used, the door 45 may need to be removed and replaced. If foamed material 62 is not used and the door frame parts 43 and 44 are releasably secured together, the panel 50f can be easily removed from the first and second door frame parts 43 and 44 and replaced.

Having described the invention in detail and by reference to the preferred embodiments thereof, it will be apparent that other modifications and variations are possible without departing from the scope of the invention defined in the appended claims.

We claim:

1. An insulated appliance comprising:

a mounting structure including a mounting frame, an inner liner and a door frame; and a plurality of vacuum insulation panels retained by said mounting structure and positioned relative to one another so as to define a substantially completely enclosed insulation shell, wherein said mounting frame comprises first and second sections, each of said sections having an insulation receiving portion defined about an outer periphery of each of said sections and securement structure for releasably securing said first and said second sections and said inner liner together, each of said vacuum insulation panels having a flange extending about its outer periphery such that the outer peripheral flange of at least one of said insulation panels is received in one or both of said receiving portions defined in the outer peripheries of said first and second sections.

2. An insulated appliance as set forth in claim 1, wherein said mounting frame is made from a fiberglass reinforced plastic.

3. An insulated appliance as set forth in claim 1, further comprising a foam panel positioned adjacent to one of said vacuum insulation panels.

4. An insulated appliance as set forth in claim 1, wherein said first section of said mounting frame is integral with said inner liner.

5. An insulated appliance as set forth in claim 4, wherein said securement structure comprises a plurality of flexible mounting straps each having opposing ends adapted to be releasably connected to said first section.

6. An insulated appliance as set forth in claim 1, wherein said securement structure comprises fasteners extending between said first and second sections for releasably connecting said first and second sections and said inner liner together.

7. An insulated appliance as set forth in claim 1, wherein said mounting structure further includes first and second sealing elements located between said door frame and one or both of said inner liner and said mounting frame for sealing said door frame with one or both of said inner liner and said mounting frame.

8. An insulated appliance as set forth in claim 1, further comprising an outer shell.

9. An insulated appliance cabinet comprising:

a mounting structure including a mounting frame, an inner liner and a door; and a plurality of vacuum insulation panels retained by said mounting structure and positioned relative to one another so as to define a substantially completely enclosed insulation shell, wherein said mounting frame comprises first and second sections, each of said sections having an insulation receiving portion defined about an outer periphery of each of said sections and securement structure for releasably securing said first and second sections and said inner liner together, each of said vacuum insulation panels having a flange extending about its outer periphery such that the outer peripheral flange of at least one of said insulation panels is received in one or both of said receiving portions defined in the outer peripheries of said first and second sections.

10. An insulated appliance cabinet as set forth in claim 9, further comprising a foam panel positioned adjacent to one of said vacuum insulation panels.

11. An insulated appliance cabinet as set forth in claim 9, further comprising an outer shell.

12. An insulated appliance as set forth in claim 9, wherein said mounting structure further includes first and second sealing elements located at the interface between said door frame and one or both of said inner liner and said mounting frame for sealing said door frame with one or both of said inner liner and said mounting frame.

13. An insulated appliance cabinet as set forth in claim 9, wherein said securement structure comprises fasteners extending between said first and second sections for releasably connecting said first and second sections and said inner liner together.

14. In insulated appliance cabinet as set forth in claim 9, wherein said first section of said mounting frame is integral with said inner liner.

15. An insulated appliance cabinet as set forth in claim 14, wherein said securement structure comprises a plurality of flexible mounting straps each having opposing ends adapted to be releasably connected to said first section.

* * * * *